United States Patent [19]

Drake

[11] 4,148,623

[45] Apr. 10, 1979

[54] CONTROLLED RELEASE FERTILIZER

[75] Inventor: Cyril F. Drake, Harlow, England

[73] Assignee: International Standard Electric Corporation, New York, N.Y.

[21] Appl. No.: 853,934

[22] Filed: Nov. 22, 1977

[51] Int. Cl.² .......................... C05B 7/00; C01B 21/06
[52] U.S. Cl. ........................................ 71/32; 423/302; 71/64 F; 71/64 G
[58] Field of Search .................. 71/27, 28, 29, 32, 48, 71/64 F, 64 G, 52; 106/47 R; 423/302

[56] References Cited

U.S. PATENT DOCUMENTS

| | | | |
|---|---|---|---|
| 2,732,290 | 1/1956 | Vana et al. | 71/28 |
| 3,082,120 | 3/1963 | Bloomfield | 423/302 |
| 3,958,973 | 5/1976 | Roberts | 71/64 G |

FOREIGN PATENT DOCUMENTS 829774  3/1960  United Kingdom .................. 106/47 R

*Primary Examiner*—Joseph Scovronek
*Assistant Examiner*—C. Konkol
*Attorney, Agent, or Firm*—James B. Raden; Harold J. Holt

[57] ABSTRACT

A nitrogen containing slow release glass fertilizer is prepared by co-melting phosphorus oxynitride with phosphorus pentoxide, an alkaline metal oxide and an oxide of a metal of Group II or Group III of the periodic table.

5 Claims, No Drawings

CONTROLLED RELEASE FERTILIZER

This invention relates to controlled release fertilizer and in particular to a nitrogen containing fertilizer of the slow release glass type.

My U.S. Pat. No. 4,123,248, filed Aug. 25, 1977, describes a biologically active slow release medium consisting of a vitreous matrix including one or more water soluble biologically active constituents together with phosphorus pentoxide which vitreous matrix may include one or more dispersed phases, the vitreous matrix having a slow rate of solution in water such that when the medium is immersed in water biologically active constituents are slowly released into solution.

According to the present invention there is provided a controlled release fertilizer composition, including a water soluble glass containing phosphorus oxynitride ($(PON)_n$) together with an alkali metal oxide, phosphorus pentoxide and an oxide of one or more metals of group II or III of the periodic table.

The fertilizer material is of the phosphate glass type which, when applied to damp soil, slowly dissolves to release its active constituents. Conveniently, the rate of solution of such a glass can be adjusted to a suitable value for a slow release fertilizer by the incorporation of calcium oxide into the glass. It is to be understood, however, that alternative oxides such as silica, alumina or iron oxide can also be employed to lower the rate of solution.

The glass compositions are based on phosphorus pentoxide which constitutes the glass forming oxides. The composition also contains glass modifying oxides, in particular an alkali metal oxide such as sodium or potassium oxide, together with an oxide of one or more metals of Group II or III of the periodic table, such as magnesium, calcium, barium or aluminum oxide. Alkali metal oxides have the effect of increasing the water solubility of the glass while the Group II or III oxides reduce the solubility. Thus, by varying the composition ratio of metal oxides in the glass the solubility rate may be adjusted to a desired value.

The nitrogen content of the fertilizer is provided by co-melting phosphorus oxynitride—$(PON)_n$—together with the other constituents. In this way inorganic nitrogen in a plant available form is dispersed into the glass matrix. The glass is allowed to cool and solidify and is then ground into a powder.

The vitreous phase may contain, in addition to nitrogen and phosphorus, and the major elements of mixed fertilizers, such as potassium, magnesium and calcium, small quantities of trace elements such as iron, boron, manganese, sulphur, vanadium, copper, zinc and molybdenum. Normally, the trace elements are incorporated at a total of not more than 1 wt. % in aggregate.

Normally, the chemical composition of a slow release fertilizer will be determined by relative quantities of the constituents that are required to be released for the specific purpose of the fertilizer. This will give a rate of release which can then be altered by changing the composition with biologically neutral constituents such as alumina and silica for slowing down the release rate, and soda for increasing it. In this context it will be appreciated that for certain crops, such as sugar-beet, the demand for soda is so great that a fertilizer is required to release soda, and, under these particular circumstances, soda can not properly be considered as a biologically neutral ingredient of the fertilizer.

In order to match the specific requirements of a particular crop it may be desirable to mix slow release fertilizer powders of different chemical compositions and particle size distributions so that the pattern of release changes with time. Thus, the nitrogen containing material may be mixed with a general fertilizer such as that described in my U.S. Pat. No. 4,123,248.

I claim:

1. A controlled release fertilizer composition comprising a water soluble glass containing phosphorus oxynitride together with an alkali metal oxide, phosphorus pentoxide and an oxide of a metal of Group II or III of the periodic table.

2. The fertilizer composition of claim 1, in which the alkali metal oxide is potassium oxide.

3. The fertilizer composition of claim 1, in which the oxide of a metal of Group II or III is calcium oxide.

4. The fertilizer composition of claim 1, containing a total of not more than 1 wt. % of trace elements.

5. The fertilizer composition of claim 1 containing silica.